United States Patent
Hedman et al.

(10) Patent No.: US 11,259,240 B2
(45) Date of Patent: Feb. 22, 2022

(54) SELECTING A NETWORK SLICE IDENTIFIER

(71) Applicant: Telefonaktiebolaget LM Ericsson (publ), Stockholm (SE)

(72) Inventors: Peter Hedman, Helsingborg (SE); Lars-Bertil Olsson, Angered (SE); Peter Ramle, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/536,765

(22) Filed: Aug. 9, 2019

(65) Prior Publication Data
US 2020/0163008 A1 May 21, 2020

Related U.S. Application Data

(63) Continuation of application No. PCT/IB2019/055851, filed on Jul. 9, 2019.

(60) Provisional application No. 62/769,453, filed on Nov. 19, 2018.

(51) Int. Cl.
*H04W 48/18* (2009.01)
*H04W 80/10* (2009.01)
*H04W 76/11* (2018.01)
*H04W 84/04* (2009.01)

(52) U.S. Cl.
CPC .......... *H04W 48/18* (2013.01); *H04W 76/11* (2018.02); *H04W 80/10* (2013.01); *H04W 84/042* (2013.01)

(58) Field of Classification Search
CPC .................................................. H04L 12/28
USPC ........................................................ 370/329
See application file for complete search history.

(56) References Cited

U.S. PATENT DOCUMENTS

2020/0022061 A1\* 1/2020 Jin .................... H04W 28/0268

FOREIGN PATENT DOCUMENTS

WO 2018234085 A1 12/2018

OTHER PUBLICATIONS

ZTE, 3GPP S2-171027, SA WG2 Meeting #119 Network Slicing Architecture Alignment for the Support of Standalone Network Slice Selection Function (NSSF), ZTE, Oracle, ETRI, Telecom Italia, KDDI, Feb. 13-17, 2017 (11 pages).
CATT, 3GPP TSG-SA WG2 Meeting #128 (S2-187180), "Solution for Connected mode mobility from EPC to 5GC," Jul. 2-26, 2018 (3 pages).
ZTE, SA WG2 Meeting #118bis (S2-170324), "Proposed Network Slicing Update to 23.501 Clause 5.13," Jan. 16-20, 2017 (4 pages).
Ericsson, "EPS to 5GS with Network Slices," 3GPP TSG-SA WG2 Meeting #129Bis (S2-1811924), Change Request, Nov. 26-30, 2018 (7 pages).

(Continued)

*Primary Examiner* — Dang T Ton
(74) *Attorney, Agent, or Firm* — Rothwell, Figg, Ernst & Manbeck, P.C.

(57) ABSTRACT

During PDN connection establishment in the EPC, a UE and a session management entity (SME) (e.g., PGW-C+SMF) exchange information. In case the SME supports more than one S-NSSAI, before the SME provides an S-NSSAI to the UE, the SME should check such that the selected S-NSSAI is among the UE's subscribed S-NSSAIs by retrieving the Subscribed S-NSSAI from a UDM using, for example, the Nudm_SDM_Get service operation.

20 Claims, 3 Drawing Sheets

(56) References Cited

OTHER PUBLICATIONS

Ericsson, "EPS to 5GS with Network Slices," 3GPP TSG-SA WG2 Meeting #129Bis (S2-1811923), Change Request, Nov. 26-30, 2018 (3 pages).
Written Opinion of the International Searching Authority issued by the European Patent Office in International Application No. PCT/IB2019/055851, dated Oct. 29, 2019 (13 pages).
International Search Report issued by the European Patent Office in International Application No. PCT/IB2019/055851, dated Oct. 29, 2019 (7 pages).
3GPP TS 23.501, V15.3.0 (Sep. 2018), 3rd Generation Partnership Project; Technical Specification Group Services and System Aspects; System Architecture for the 5G System; Stage 2 (Release 15), Sep. 2018 (226 pages).
3GPP TS 23.502, V15.3.0 (Sep. 2018), 3rd Generation Partnership Project; Technical Specification Group Services and System Aspects; Procedures for the 5G System; Stage 2 (Release 15), Sep. 2018 (330 pages).

\* cited by examiner

SELECTING A NETWORK SLICE IDENTIFIER

CROSS REFERENCE TO RELATED APPLICATION(S)

This application is a continuation of International patent application no. PCT/IB2019/055851, filed on Jul. 9, 2019, which claims priority to U.S. provisional patent application No. 62/769,453, filed on Nov. 19, 2018; this application also claims the benefit of U.S. provisional patent application No. 62/769,453, filed on Nov. 19, 2018. The above identified applications are incorporated by this reference.

TECHNICAL FIELD

Disclosed are embodiments related to connecting selecting a network slice identifier.

BACKGROUND

The Third Generation Partnership Project (3GPP) is working on the development and design of the next generation mobile communications system (a.k.a., the 5G mobile communication system or the Next Generation (NG) system or simply "5GS" or "NG" for short). 3GPP is currently in the process of specifying the 5G radio interface called New Radio (NR) or "5G-RAN" as well as a Next Generation Packet Core Network (NG-CN or 5GC). 5GS is a new system that is different from the legacy Evolved Packet System (EPS) also when EPS is extended to support the new 5G radio access named New Radio (NR).

A user equipment (UE) (i.e., a device capable of wireless communication with a radio access network node, such as, for example, a smartphone, a laptop, a tablet, a smart sensor, an appliance, etc.) needs to register with a network in order to receive services which require registration. A registration procedure is utilized in the following situations: (1) when the UE initially registers to a 5G system; (2) when the UE initiates a registration procedure due to mobility, e.g. when the UE changes to a new Tracking Area (TA) in idle mode; (3) when the UE performs a periodic update due to expiration of a predefined time period of inactivity, etc.

As part of the 5G work in 3GPP, a network slice has been described as a logical network that provides specific network capabilities and network characteristics, and a network slice instance as a set of network function instances and the required resources (e.g. compute, storage and networking resources) which form a deployed network slice. Further details on network slicing are described in 3GPP TS 23.501, v1.0.0 (2017-06) "3rd Generation Partnership Project; Technical Specification Group Services and System Aspects; System Architecture for the 5G System; Stage 2" (Release 15) ("3GPP TS 23.501"), and specifically clause 5.15 Network Slicing.

By way of background, according to 3GPP TS 23.501, clause 5.15.1, "Network slices may differ for supported features and network functions optimisations. The operator may deploy multiple Network Slice instances delivering exactly the same features but for different groups of UEs, e.g. as they deliver a different committed service and/or because they may be dedicated to a customer. A single UE can simultaneously be served by one or more Network Slice instances via a 5G-AN. A single UE may be served by at most 8 Network Slices at a time. The AMF instance serving the UE logically belongs to each of the Network Slice instances serving the UE, i.e. this AMF instance is common to the Network Slice instances serving a UE."

An S-NSSAI (Single Network Slice Selection Assistance Information) identifies a Network Slice, and an NSSAI is a list of S-NSSAIs. More specifically, an S-NSSAI contains a slice/service type (SST) and may also contain a slice differentiator (SD). Further, as provided in 3GPP TS 23.501, clause 5.15.2.1: "The (R)AN may use Requested NSSAI in access stratum signalling to handle the UE Control Plane connection before the 5GC informs the (R)AN of the Allowed NSSAI. The Requested NSSAI is not used by the RAN for routing when the UE provides also a Temporary User ID . . . . When a UE is successfully registered, the CN informs the (R)AN by providing the whole Allowed NSSAI for the Control Plane aspects."

Each S-NSSAI may have a standardized value or a public land mobile network (PLMN) specific value. Where the S-NSSAI has a PLMN-specific value, the PLMN-specific value is associated to a PLMN ID of the PLMN that assigns it.

Regarding the storage of NSSAI (collection of S-NSSAIs) in the UE, clause 5.15.4 of TS 23.501 states the following: "A UE can be configured by the HPLMN [home PLMN] with a Configured NSSAI per PLMN. A Configured NSSAI can be PLMN-specific and the HPLMN indicates to what PLMN(s) each Configured NSSAI applies, including whether the Configured NSSAI applies to all PLMNs, i.e. the Configured NSSAI conveys the same information regardless of the PLMN the UE is accessing (e.g. this could be possible for NSSAIs containing only standardized S-NSSAIs). When providing a Requested NSSAI to the network upon registration, the UE in a given PLMN shall only use S-NSSAIs belonging to the Configured NSSAI, if any, of that PLMN. Upon successful completion of a UE's Registration procedure, the UE may obtain from the AMF an Allowed NSSAI for this PLMN, which may include one or more S-NSSAIs . . . . For each PLMN, the UE shall store the Configured NSSAI and, if any, the Allowed NSSAI. When the UE receives an Allowed NSSAI for a PLMN, it shall store it and override any previously stored Allowed NSSAI for this PLMN."

Particularly for roaming the TS 23.501 clause 5.15.6 stipulates that: "For roaming scenarios, the Network Slice specific network functions in VPLMN and HPLMN are selected based on the S-NSSAI provided by the UE during PDU connection establishment as following. If a standardized S-NSSAI is used, then selections of slice specific NF instances are done by each PLMN based on the provided S-NSSAI; Otherwise, the VPLMN maps the S-NSSAI of HPLMN to a S-NSSAI of VPLMN based on roaming agreement (including mapping to a default S-NSSAI of VPLMN). The selection of slice specific NF instance in VPLMN are done based on the S-NSSAI of VPLMN, and the selection of any slice specific NF instance in HPLMN are based on the S-NSSAI of HPLMN."

SUMMARY

There is a need to provide for interworking between 5GS and legacy systems. For example, an issue is that a PGW-C+SMF (which may support more than one S-NSSAI) does not know which are the Subscribed S-NSSAIs for a UE (in case a non-subscribed S-NSSAI is returned the PDN Connection will be released when moving to 5GS). Therefore, the PGW-C+SMF would need to ensure that the S-NSSAI provided to the UE is a Subscribed S-NSSAI (and also do a mapping to VPLMN value in case PGW-C+SMF is located in a VPLMN).

Accordingly, in one aspect there is provided a method that includes a session management entity transmitting to a data management function a request for a set of subscribed network slice identifiers identifying one or more network slices to which a UE is subscribed. The method further includes the session management entity receiving, from the data management function, a first set of network slice identifiers to which the UE is subscribed. The method also includes the session management entity selecting a network slice identifier and transmitting, to the UE, a message indicating the selected network slice identifier. The step of selecting the network slice identifier comprises either: i) selecting, from the received first set of network slice identifiers to which the UE is subscribed, a network slice identifier that is supported by the session management entity or ii) selecting a network slice identifier that is supported by the session management entity, the selected network slice identifier being selected from a second set of network slice identifiers to which the first set of network slice identifiers are mapped.

BRIEF DESCRIPTION OF THE DRAWINGS

The accompanying drawings, which are incorporated herein and form part of the specification, illustrate various embodiments.

DETAILED DESCRIPTION

For a UE being served by Evolved Packet System (EPS) and with established protocol data network (PDN) connections, there are three different scenarios for a data connection (e.g., a PDN connection): 1) the UE may be served in its home network; 2) the UE may be served in a visited network with home routed traffic; or 3) the UE may be served in a visited network with local breakout (LBO).

A UE may be transferred from EPS to 5GS from any of these cases. In transferring the UE to 5GS, it is desirable to avoid releasing the UE's current PDN connections. In each of the three cases noted above where a UE has surviving PDN connections when moving to 5GS, a session management node (e.g., a combined Packet Data Network Gateway Control (PGW-C)+Session Management Function (SMF)) may be used. During PDN Connection establishment, the UE may allocate a respective PDU Session ID and send it to the session management node (for example, via a protocol configuration options (PCO) information element). A network slice identifier (e.g., a S-NSSAI) associated with each PDN connection may be determined based on the operator policy by the session management node. For example, the session management node may determine the network slice identifier based on a combination of a session management node address and an access point name (APN). The determined network slice identifier may be sent to the UE in a message (e.g., a PCO) together with a PLMN ID to which the network slice identifier relates. This process is generally described in clause 5.15.7.1 of 3GPP TS 23.501 v15.3.0, which is incorporated by reference herein.

When UE moves from EPS to 5GS, the UE may include the network slice identifiers (with values for the Serving PLMN of the target 5GS, if available) associated with the established PDN connections in the Requested NSSAI in RRC Connection Establishment and NAS. The UE may also provide to the AMF in the Registration Request message the mapping information as described in clause 5.15.6. This process is generally described in clause 5.15.7.2 of 3GPP TS 23.501 v15.3.0.

In cases 1 and 2, the session management node may transmit to the UE network slice identifiers that are valid in the UE's home network (e.g., home network S-NSSAI(s)/hS-NSSAI(s)).

In case 3, the session management node may transmit to the UE network slice identifiers that are valid in the visited network (e.g., visited network S-NSSAI(s)/vS-NSSAI(s)).

Without checking the UE's subscription information to confirm that an allocated network slice is allowed, there is a risk at mobility from EPS to 5GS that one or more of the UE's PDU sessions may be released. The network slice identifier received by the UE from the session management node may be transmitted by the UE to an AMF. The AMF may then attempt to verify that the UE is allowed to use the identified network slice(s). If the identified network slice(s) are not allowed, the AMF may release the respective PDU sessions. It is possible to avoid this negative outcome in a case where the session management node supports at least one network slice that is also allowed according to the UE's subscription information. Accordingly, there is a need for a session management node that can ensure that an allocated network slice identifier is allowed according to the UEs subscription information.

Figure 1:
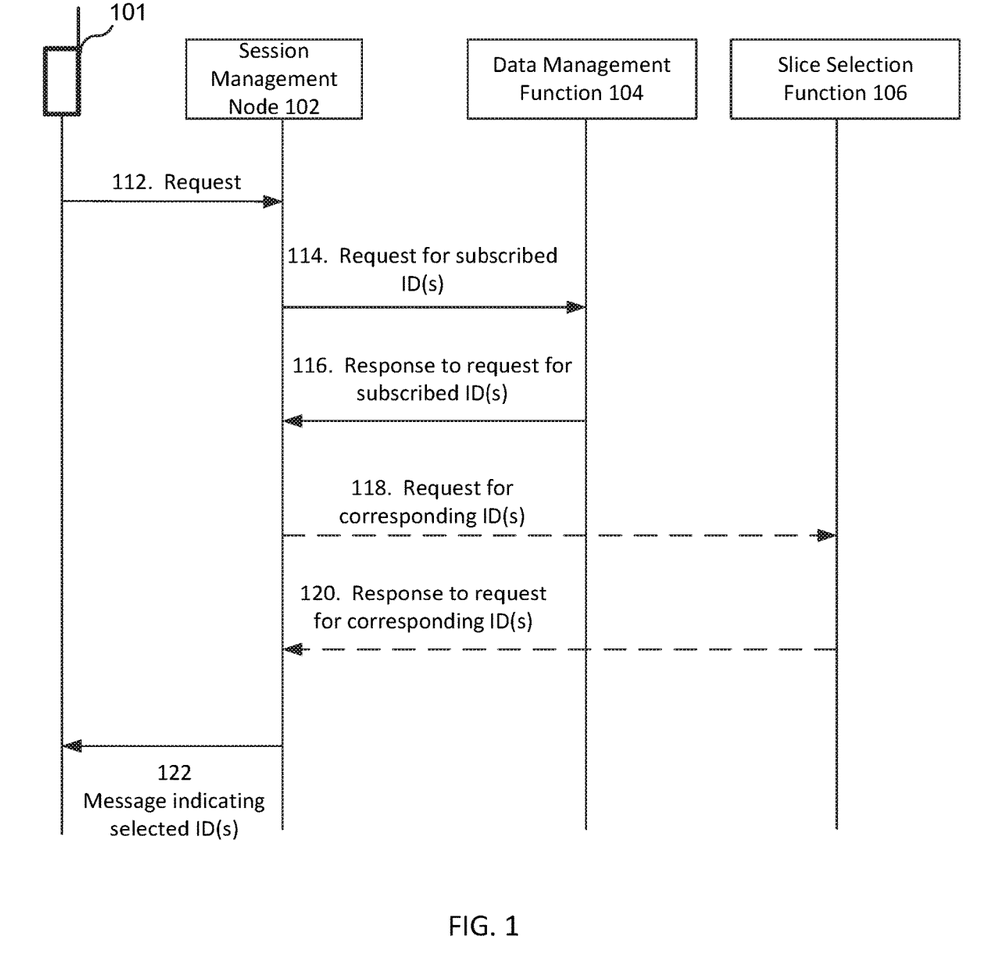
FIG. 1 diagrams an exemplary message flow for allocating a network slice according to some embodiments.

FIG. 1 diagrams an exemplary message flow for allocating a network slice when moving a UE from a legacy network to 5GS. At step 112, a session management node 102 (also referred to as a session management entity (SME) 102) receives a request to allocate one or more network slice identifiers. In some embodiments, the request 112 may be received, directly or indirectly, from a UE. In some embodiments, the request 112 may be a Create Session Request. In some embodiments, the session management node may be a Session Management Function in 5GS, a PGW in EPS, or a combination thereof (e.g., a PGW-C+SMF). At step 114, the session management node 102 may transmit to a data management function 104 a request for network slice identifiers to which the UE is subscribed. In some embodiments, this step is only performed if node 102 supports more than one network slice identifier. The data management function 104 may store or have access to subscription information for the UE. In some embodiments, the data management function 104 may be a Unified Data Management Function. At step 116, the session management node 102 may receive from the data management function 104 a response to the request 114 for subscribed network slice identifiers. The response 116 may include a set of one or more identifiers which may, for example, identify one or more network slices that the UE is allowed to use. For example, the response may include a set of hS-NSSAIs for the UE (an hS-NSSAI is an S-NSSAI that is valid in the UE's home network). In some embodiments, steps 114 and 116 may be achieved by letting the session management node 102 use the Nudm_SDM_Get (SUPI, Slice Selection Subscription data) service, which is available to the AMF in current versions of 5GS standards.

If the UE is served in its home network or in a visited network with home routed traffic (i.e., in cases 1 or 2), the session management node 102 may select a network slice identifier from among the network slice identifiers received in response 116. The session management node 102 preferably selects a network slice identifier that is both (i) among the received set of network slice identifiers, and (ii) supported by the session management node 102. If no network slice identifier satisfying both conditions exists, the session management node 102 may instead select from among the network slice identifiers that are supported by the session management node 102. In this case, the session management node 102 may notify the operator(s) of the UE's home network and/or the visiting network that a node meeting both selection criteria (authorized for use by the UE and supported by the node 102) could not be determined.

If the UE is served in a visited network with local breakout (LBO) (i.e., in case 3), however, the session management node 102 may perform optional step 118 to determine a network slice identifier for the visiting network (e.g., a vS-NSSAI) that is mapped to the network slice identifier (e.g., a hS-NSSAI) received from the data management function. In step 118, the session management node 102 may transmit to a slice selection function 106 (e.g., a Network Slice Selection Function (NSSF)) a request for visiting network slice identifiers that correspond to one or more of the home network slice identifiers received from the data management function 104. In some embodiments, the request 118 may include one, some, or all of the network slice identifiers received in response 116 from the data management function. In step 120, the session management node 102 may receive from the slice selection function 106 a response indicating a set of one or more visiting network slice identifiers that correspond to the home network slice identifiers transmitted in request 118. In some embodiments, the slice selection function 106 may determine visiting slice identifiers by referencing an indexing table in which slice identifiers for one network operator are mapped to slice identifiers for another network operator. The result of that mapping operation may be transmitted to the session management node 102 in response 120. In some embodiments, to get the mapping between subscribed S-NSSAIs and corresponding vS-NSSAIs (i.e., S-NSSAIs valid in the visited network corresponding to the subscribed S-NSSAIs), an adjusted version of the Nnssf_NSSelection_Get service from the NSSF may be used. The service may be available from the PGW-C+SMF and as input/output it should be possible to provide a subscribed S-NSSAI (e.g., a network slice identifier received in step 114).

In case 3, the session management node 102 may then select a network slice identifier that is both (i) supported by the session management node 102, and (ii) among the set of visiting network slice identifiers received from the slice selection function 106. In this sense, the selected identifier may be from among a second set of network slice identifiers that corresponds to the first set of network slice identifiers received from the data management function. As discussed above, if no such node exists, the session management node 102 may instead select from among the network slice identifiers that are supported by the session management node 102. In this case, the session management node 102 may notify the operator(s) of the UE's home network and/or the visiting network that a node meeting both selection criteria (mapped to a subscribed slice identifier and supported by the node 102) could not be determined.

In any of cases 1, 2, and 3, the session management node 102 may then transmit the selected network slice identifier(s), directly or indirectly, to the UE per step 122. In some embodiments, this information may be included in a PCO. In some embodiments, the information may be transmitted in a Create Session Response. In some embodiments, the UE may be served by the session management node 102 in a second network (e.g., a 3G or 4G network) at the time that the request 112 is received. In some embodiments, the UE has existing data network connections (e.g., PDN connections), and the request 112 is transmitted, directly or indirectly, from the UE and includes a session identifier identifying one or more of the UE's PDN connections. In some embodiments, the message 122 transmitted to the UE may indicate that the selected network slice identifier(s) are associated with respecting PDN connection(s) of the UE. In some embodiments, one respective selected network slice identifier may be transmitted to the UE for each of the UE's PDN connection(s).

In sum, for case 1 and 2, the procedure in a combined PGW-C+SMF may look like: 1. Fetch subscribed S-NSSAIs (hS-NSSAIs) from UDM; 2. Select a h-NSSAI from the hS-NSSAIs acquired in step 1 and include it in the PCO to the UE at PDN connection establishment.

For case 3, the procedure in a combined PGW-C+SMF may look like: 1. Fetch subscribed S-NSSAIs (hS-NSSAIs) from UDM; 2. Get corresponding vS-NSSAI for each subscribed S-NSSAI by querying the NSSF; 3. Select a vS-NSSAI from the vS-NSSAIs acquired in step 2 and include it in the PCO to the UE at PDN connection establishment.

In summary, the PGW-C+SMF may retrieve a Subscribed S-NSSAI to compare with the S-NSSAIs the PGW-C+SMF supports/serves and then decides which of these to use and send towards the UE in PCO.

Figure 2:
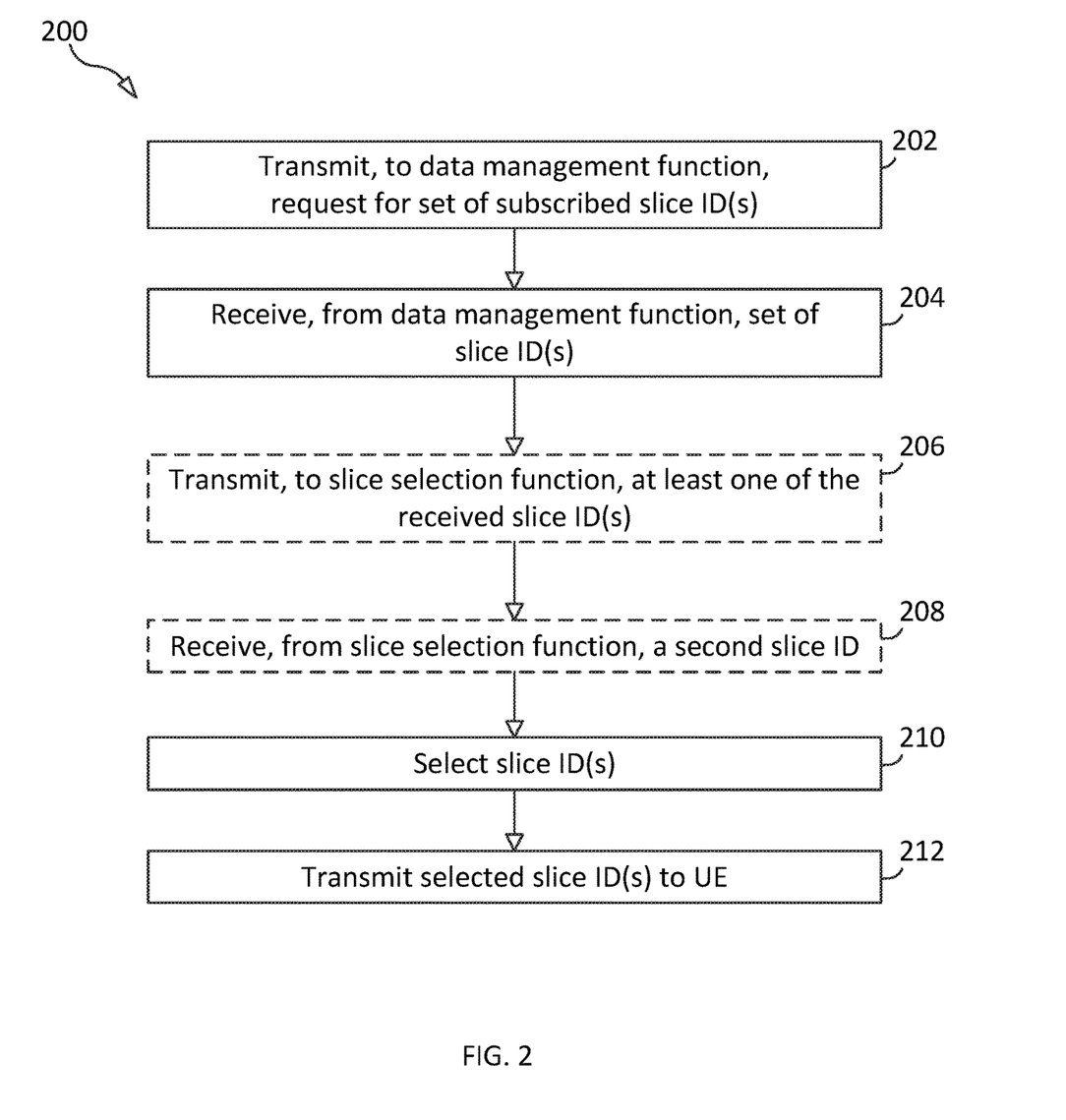
FIG. 2 shows an exemplary method for allocating a network slice according to some embodiments.

FIG. 2 shows a flowchart for a method 200, which generally reflects to the steps performed by the session management node 102 in the diagram shown in FIG. 1. In step 202, the session management node may transmit, to a data management function, a request for a set of network slice identifiers to which the UE is subscribed. In step 204, the session management node may receive, from a data management function, a set of network slice identifiers. The set of network slice identifiers may indicate one or more network slices to which the UE is subscribed. Blocks 206 and 208 show optional steps which may be performed in a case where a data connection is routed through a visiting network using LBO. In optional step 206, the session management node may transmit, to a slice selection function, at least one of the network slice identifiers (e.g., hS-NSSAIs) received from the data management function. In some embodiments, more than one or all of the received identifiers (e.g., hS-NSSAIs) may be transmitted to the slice selection function. In optional step 208, the session management node may receive, from the slice selection function, a second network slice identifier. In some embodiments, the second network slice identifier may identify a slice in the visiting network (for example, the second network slice identifier may be a vS-NSSAI). In some embodiments, the session management node may receive a respective visiting network slice identifier for each of the home network slice identifiers transmitted in step 206. In some embodiments, each received visiting slice identifier may correspond to a respective home network slice identifier in indexing table in which slice identifiers for one network operator are mapped to slice identifiers for another network operator.

In step 210, the session management node may select a network slice identifier. In cases 1 and 2, the session management node may select an identifier that is both (i) supported by the session management node, and (ii) among the set of identifiers received from the data management function. For example, the session management node may determine that the first network slice identifier matches one of a plurality of network slice identifiers identifying a network slice supported by the session management node, and select a first network slice identifier from among the set of identifiers received from the data management function.

In case 3, the session management node may select an identifier that is both (i) supported by the session management node, and (ii) among the set of identifiers received from the slice selection function. For example, the session management node may determine that the second network slice identifier received from the slice selection function matches one of a plurality of network slice identifiers identifying a network slice supported by the session management node, and the select the second slice identifier.

Figure 3:
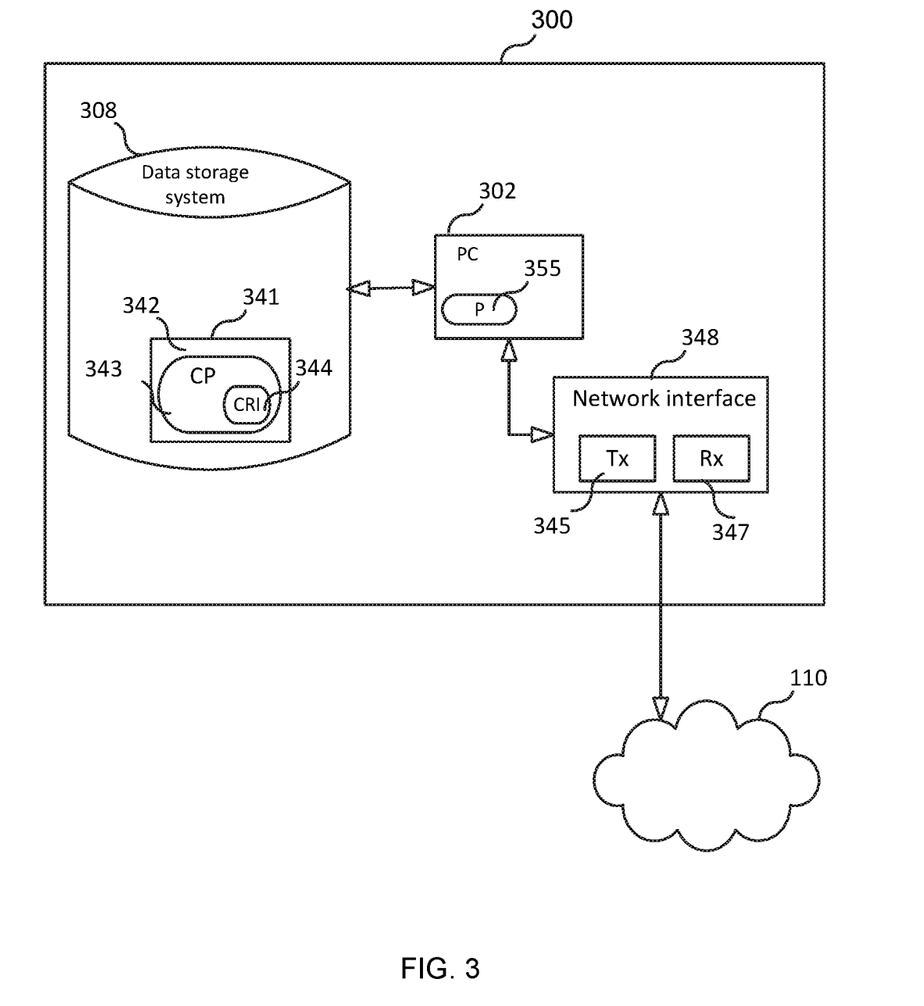
FIG. 3 is a block diagram of an apparatus 300, according to some embodiments, for implementing a session management node.

FIG. 3 is a block diagram of an apparatus 300, according to some embodiments, for implementing the session management node 102. As shown in FIG. 3, apparatus 300 may comprise: processing circuitry (PC) 302, which may include one or more processors (P) 355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed; a network interface 348 comprising a transmitter (Tx) 345 and a receiver (Rx) 347 for enabling apparatus 300 to transmit data to and receive data from other nodes connected to a network 110 (e.g., an Internet Protocol (IP) network) to which network interface 348 is connected; and a local storage unit (a.k.a., "data storage system") 308, which may include one or more non-volatile storage devices and/or one or more volatile storage devices. In embodiments where PC 302 includes a programmable processor, a computer program product (CPP) 341 may be provided. CPP 341 includes a computer readable medium (CRM) 342 storing a computer program (CP) 343 comprising computer readable instructions (CRI) 344. CRM 342 may be a non-transitory computer readable medium, such as, magnetic media (e.g., a hard disk), optical media, memory devices (e.g., random access memory, flash memory), and the like. In some embodiments, the CRI 344 of computer program 343 is configured such that when executed by PC 302, the CRI causes apparatus 300 to perform steps described herein (e.g., steps described herein with reference to the flow charts). In other embodiments, apparatus 300 may be configured to perform steps described herein without the need for code. That is, for example, PC 302 may consist merely of one or more ASICs. Hence, the features of the embodiments described herein may be implemented in hardware and/or software.

APPENDIX A FROM THE PROVISIONAL PATENT APPLICATION

The provisional patent application to which this application claims priority included an Appendix A, which is reproduced in relevant part below:

Change Request

Reason for change: at PDN Connection establishment in a combined PGW-C+SMF an S-NSSAI shall be allocated in preparation for a move to 5GS (refer to 23.501 clause 5.15.7.1). The combined PGW-C+SMF should ensure that the allocated S-NSSAI is allowed according to the UEs subscribed S-NSSAIs.

Summary of change: 1) Make the Nudm_SDM_Get (SUPI, Slice Selection Subscription data) service available also by SMF; and 2) Make the Nnssf_NSSelection_Get service available also by PGW-C+SMF. Make it possible to use subscribed S-NSSAIs as input/output instead of "S-NS-SAIs for the HPLMN associated with established PDN connection."

Consequences if not approved: There is a risk at mobility from EPS to 5GS that AMF needs to release PDU Session(s) associated to S-NSSAI(s) not allowed according to the UEs subscribed S-NSSAIs.

4.11.0a Impacts to EPS Procedures 4.11.0a.1 General

This clause captures changes to procedures in TS 23.401 [13] that are common to interworking based on N26 and interworking without N26.

4.11.0a.2 Interaction with PCC

When interworking with 5GS is supported and a "PGW-C+SMF" is selected for a UE, policy interactions between PDN GW and PCRF specified in TS 23.401 [13] are replaced by equivalent interactions between PGW-C+SMF and PCRF+PCF as follows:

(PCEF initiated) IP-CAN Session Establishment procedure is replaced by SM Policy Association Establishment Procedure as described in clause 4.16.4.

IP-CAN Session Modification procedure is replaced by SM Policy Association Modification procedure as described in clause 4.16.5.

IP-CAN Session Termination procedure is replaced by SM Policy Association Termination procedure as described in clause 4.16.6.

4.11.0a.3 Mobility Restrictions

The UE's subscription may include access restriction for NR in 5GS and restriction for Core Network Type (5GC). If so, the HSS provides these restrictions to the MME. The MME includes these restrictions in the Handover Restriction List to the E-UTRAN. The MME and E-UTRAN use these restrictions to determine if mobility of the UE to 5GS or NR connected to 5GS should be permitted.

4.11.0a.4 PGW Selection

When the UE requests to establish a PDN connection to an APN, the MME may use the UE's support for 5GC NAS indication included in the UE Network Capability and/or UE's subscription from HSS that includes UE's mobility restriction parameters related to 5GS and/or indication of support for interworking with 5GS for this APN to determine if PGW-C+SMF or a standalone PGW-C should be selected.

If restriction for Core Network Type indicates that the UE can access to 5GC, it implies that the UE has 5G subscription data.

4.11.0a.5 PDN Connection Establishment

During PDN connection establishment in the EPC, the UE and the PGW-C+SMF exchange information via PCO as described in 23.501 [2] clause 5.15.7. In case the PGW-C+SMF supports more than one S-NSSAI, before the PGW-C+SMF provides an S-NSSAI to the UE, the PGW-C+SMF should check such that the selected S-NSSAI is among the UEs subscribed S-NSSAIs by retrieving the Subscribed S-NSSAI from UDM using the Nudm_SDM_Get service operation. If the PGW-C+SMF is in a VPLMN, the PGW-C+SMF uses the Nnssf_NSSelection_Get service operation to retrieve a mapping of the Subscribed S-NSSAIs to Serving PLMN S-NSSAI values.

5.2.3.3.1 General

Subscription data types used in the Nudm_Subscriber-DataManagement Service are defined in Table 5.2.3.3.1-1 below.

TABLE 5.2.3.3.1-1

| UE Subscription data types | | |
|---|---|---|
| Subscription data type | Field | Description |
| Access and Mobility Subscription data (data needed for UE Registration and Mobility Management) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Subscribed-UE-AMBR | The Maximum Aggregated uplink and downlink MBRs to be shared across all Non-GBR QoS Flows according to the subscription of the user. |
| | Subscribed S-NSSAIs | The Network Slices that the UE subscribes to. In the roaming case, it indicates the subscribed Network Slices applicable to the Serving PLMN. |
| | Default S-NSSAIs | The Subscribed S-NSSAIs marked as default S-NSSAI. In the roaming case, only those applicable to the Serving PLMN. |
| | UE Usage Type | As defined in TS 23.501 [2], clause 5.15.7.2. |
| | RAT restriction | 3GPP Radio Access Technology(ies) not allowed the UE to access. |
| | Forbidden area | Defines areas in which the UE is not permitted to initiate any communication with the network. |
| | Service Area Restriction | Indicates Allowed areas in which the UE is permitted to initiate communication with the network, and Non-allowed areas in which the UE and the network are not allowed to initiate Service Request or SM signalling to obtain user services. |
| | Core Network type restriction | Defines whether UE is allowed to connect to 5GC and/or EPC for this PLMN. |
| | RFSP Index | An index to specific RRM configuration in the NG-RAN. |
| | Subscribed Periodic Registration Timer | Indicates a subscribed Periodic Registration Timer value. |
| | Priority Services | Indicates the user is subscribed to priority service (MPS) as indicated in TS 23.501 [2], clause 5.16.5. |
| | UE behavioural information/ Communication patterns | Information on expected UE movement and communication characteristics. See clause 4.15.6.2 |
| | Steering of Roaming | List of preferred PLMN/access technology combinations or HPLMN indication that no change of the "Operator Controlled PLMN Selector with Access Technology" list stored in the UE is needed (see NOTE 3). Optionally includes an indication that the UDM requests an acknowledgement of the reception of this information from the UE. |
| | Network Slicing Subcription Change Indicator | When present, indicates to the serving AMF that the subscription data for network slicing changed and the UE configuration must be updated. |
| | Tracing Requirements | Trace requirements about a UE (e.g. trace reference, address of the Trace Collection Entity, etc.) is defined in TS 32.421 [39]. This information is only sent to AMF in the HPLMN or one of its equivalent PLMN(s). |
| Slice Selection Subscription data (data needed for Slice Selection as described in clause 4.2.2.2.3 and in clause 4.11.0a.5) | Subscribed S-NSSAIs | The Network Slices that the UE subscribes to. In roaming case, it indicates the subscribed network slices applicable to the serving PLMN. |
| UE context in AMF data | AMF | Allocated AMF for the registered UE. Include AMF address and AMF NF Id. |
| | Access Type | 3GPP or non-3GPP access through this AMF |
| | Homogenous Support of IMS Voice over PS Sessions for AMF | Indicates per UE and AMF if "IMS Voice over PS Sessions" is homogeneously supported in all TAs in the serving AMF or homogeneously not supported, or, support is non- homogeneous/unknown, see clause 5.16.3.3 of TS 23.501 [2]. |

TABLE 5.2.3.3.1-1-continued

UE Subscription data types

| Subscription data type | Field | Description |
|---|---|---|
| SMF Selection Subscription data (data needed for SMF Selection as described in clause 6.3.2 of TS 23.501 [2]) | SUPI | Key |
| | SMF Selection Subscription data contains one or more S-NSSAI level subscription data: | |
| | S-NSSAI | Indicates the value of the S-NSSAI. |
| | Subscribed DNN list | List of the subscribed DNNs for the UE (NOTE 1). |
| | Default DNN | The default DNN if the UE does not provide a DNN (NOTE 2). |
| | LBO Roaming Information | Indicates whether LBO roaming is allowed per DNN, or per (S-NSSAI, subscribed DNN) |
| | Interworking with EPS indication list | Indicates for which DNN from the Subscribed DNN list interworking is supported. |
| UE context in SMF data | SUPI | Key |
| | PDU Session Id(s) | List of PDU Session Id(s) for the UE |
| | For each PDU Session Id: | |
| | DNN | DNN for the PDU Session. |
| | SMF | Allocated SMF for the PDU Session. Includes SMF IP Address and SMF NF Id. |
| SMS Management Subscription data (data needed by SMSF for SMSF Registration) | SMS parameters | Indicates SMS parameters subscribed for SMS service such as SMS teleservice, SMS barring list |
| | Trace Requirements | Trace requirements about a UE (e.g. trace reference, address of the Trace Collection Entity, etc.) is defined in TS 32.421 [39]. This information is only sent to a SMSF in HPLMN. |
| SMS Subscription data (data needed in AMF) | SMS Subscription | Indicates subscription to any SMS delivery service over NAS irrespective of access type. |
| UE Context in SMSF data | SMSF Information | Indicates SMSF allocated for the UE, including SMSF address and SMSF NF ID. |
| | Access Type | 3GPP or non-3GPP access through this SMSF |
| Session Management Subscription data (data needed for PDU Session Establishment) | GPSI List | List of the GPSI (Generic Public Subscription Identifier) used both inside and outside of the 3GPP system to address a 3GPP subscription. |
| | Internal Group ID-list | List of the subscribed internal group(s) that the UE belongs to. |
| | Trace Requirements | Trace requirements about a UE (e.g. trace reference, address of the Trace Collection Entity, etc . . .) is defined in TS 32.421 [39]. This information is only sent to a SMF in the HPLMN or one of its equivalent PLMN(s). |
| | Session Management Subscription data contains one or more S-NSSAI level subscription data: | |
| | S-NSSAI | Indicates the value of the S-NSSAI. |
| | Subscribed DNN list | List of the subscribed DNNs for the S-NSSAI (NOTE 1). |
| | For each DNN in S-NSSAI level subscription data: | |
| | DNN | DNN for the PDU Session. |
| | UE Address | Indicates the subscribed static IP address(es) for the IPv4 or IPv6 or IPv4v6 type PDU Sessions accessing the DNN, S-NSSAI. |
| | Allowed PDU Session Types | Indicates the allowed PDU Session Types (IPv4, IPv6, IPv4v6, Ethernet, and Unstructured) for the DNN, S-NSSAI. |
| | Default PDU Session Type | Indicates the default PDU Session Type for the DNN, S-NSSAI. |
| | Allowed SSC modes | Indicates the allowed SSC modes for the DNN, S-NSSAI. |
| | Default SSC mode | Indicate the default SSC mode for the DNN, S-NSSAI. |
| | Interworking with EPS indication | Indicates whether interworking with EPS is supported for this DNN and S-NSSAI. |
| | 5GS Subscribed QoS profile | The QoS Flow level QoS parameter values (5QI and ARP) for the DNN, S-NSSAI (see clause 5.7.2.7 of TS 23.501 [2]). |
| | Charging Characteristics | This information is defined in TS 32.240 [34]; it may e.g. contain information on how to contact the Charging Function. This information, when provided shall override any corresponding predefined information at the SMF |
| | Subscribed-Session-AMBR | The maximum aggregated uplink and downlink MBRs to be shared across all Non-GBR QoS Flows in each PDU Session, which are established for the DNN, S-NSSAI. |

TABLE 5.2.3.3.1-1-continued

UE Subscription data types

| Subscription data type | Field | Description |
|---|---|---|
| | Static IP address/prefix | Indicate the static IP address/prefix for the DNN, S-NSSAI. |
| | User Plane Security Policy | Indicates the security policy for integrity protection and encryption for the user plane. |
| Identifier translation | SUPI | Corresponding SUPI for input GPSI |
| | (Optional) MSISDN | Corresponding GPSI (MSISDN) for input GPSI (External Identifier). This is optionally provided for legacy SMS infrastructure not supporting MSISDN-less SMS. The presence of an MSISDN should be interpreted as an indication to the NEF that MSISDN shall be used to identify the UE when sending the SMS to the SMS-SC via T4. |
| Intersystem continuity Context | (DNN, PGW FQDN) list | For each DNN, indicates the PGW-C + SMF which support interworking with EPC. |

(NOTE 1):
The Subscribed DNN list can include a wildcard DNN.
(NOTE 2):
The default DNN shall not be a wildcard DNN.
(NOTE 3):
The Steering of Roaming information is protected using the mechanisms defined in TS 33.501 [15].

TABLE 5.2.3.3.1-2

Group Subscription data types

| Subscription data type | Field | Description |
|---|---|---|
| Group Identifer translation | External Group Identifier | Identifies external group of UEs that the UE belongs to as defined in TS 23.682 [23] |
| | (Optional) Internal Group Identifier | Identifies internal group of UEs that the UE belongs to as defined in TS 23.501 [2] |
| | SUPI list | Corresponding SUPI list for input External Group Identifier |

At least a mandatory key is required for each Subscription Data Type to identify the corresponding data. Depending on the use case, for some Subscription Data Types it is possible to use one or multiple sub keys to further identify the corresponding data, as defined in Tables 5.2.3.3.1-3 and 5.2.3.3.1-4 below:

TABLE 5.2.3.3.1-3

UE Subscription data types keys

| Subscription Data Types | Data Key | Data Sub Key |
|---|---|---|
| Access and Mobility Subscription data | SUPI | — |
| SMF Selection Subscription data | SUPI | — |
| UE context in SMF data | SUPI | S-NSSAI |
| SMS Management Subscription data | SUPI | — |
| SMS Subscription data | SUPI | |
| UE Context in SMSF data | SUPI | |
| Session Management Subscription data | SUPI | S-NSSAI DNN |
| Identifier translation | GPSI | — |
| Slice Selection Subscription data | SUPI | — |
| Intersystem continuity Context | SUPI | DNN |

TABLE 5.2.3.3.1-4

Group Subscription data types keys

| Subscription Data Types | Data Key | Data Sub Key |
|---|---|---|
| Group Identifier translation | External Group Identifier | |

5.2.3.3.2 Nudm_SDM_Get service operation

Service Operation name: Nudm_SDM_Get.

Description: Consumer NF gets the subscriber data indicated by the subscription data type input from UDM. The UDM shall check the requested consumer is authorized to get the specific subscription data requested. In case of NF consumer is SMF, the subscriber data may contain e.g. Allowed PDU Session Type(s), Allowed SSC mode(s), default 5QI/ARP, Subscribed S-NSSAI(s).

Inputs, Required: NF ID, Subscription data type(s), Key for each Subscription data type(s).

Inputs, Optional: Data Sub Key(s).

Outputs, Required: The consumer NF gets the requested subscription data.

Outputs, Optional: None.

5.2.16.2 Nnssf_NSSelection service 5.2.16.2.1 Nnssf_NSSelection_Get service operation Service operation name: Nnssf_NSSelection_Get Description: This service operation enables Network Slice selection in both the Serving PLMN and HPLMN. It also enables the NSSF to provide to the AMF the Allowed NSSAI and the Configured NSSAI for the Serving PLMN.

It may be invoked during Registration procedure, during PDU Session Establishment procedure or during UE Configuration Update procedure. When invoked during Registration procedure it may possibly trigger AMF re-allocation. When invoked during PDU Session Establishment procedure it may be invoked in the VPLMN or in the HPLMN. When invoked during UE Configuration Update procedure it may be invoked in the Serving PLMN.

The list of events, which trigger invoking of the Nnssf_NSSelection_Get service operation, is not exhaustive.

Inputs, Required: None.

Inputs, Conditional Required:

If this service operation is invoked during Registration procedure not triggered by mobility from EPS to 5GS or UE Configuration Update procedure, then the following inputs are required: Requested NSSAI, Subscribed S-NSSAI(s) with the indication if marked as default S-NSSAI, PLMN ID of the SUPI, TAI, NF type of the NF service consumer, Requester ID.

If this service operation is invoked during Registration procedure triggered by mobility from EPS to 5GS with N26 (as described in clause 4.11.1.3.3), the following inputs are required: S-NSSAIs for the HPLMN associated with established PDN connection, PLMN ID of the SUPI, NF type of the NF service consumer, Requester ID.

If this service operation is invoked during PDN Connection Establishment in the Serving PLMN in EPS by a PGW-C+SMF, the following inputs are required:

Subscribed S-NSSAIs for the UE, PLMN ID of the SUPI, NF type of the NF service consumer, Requester ID.

Else, if this service operation is invoked during PDU Session Establishment procedure in the Serving PLMN then the following inputs are required: S-NSSAI, non-roaming/LBO roaming/HR roaming indication, PLMN ID of the SUPI, TAI, NF type of the NF service consumer, Requester ID.

Inputs, Optional:

If this service operation is invoked during Registration procedure not triggered by mobility from EPS to 5GS or UE Configuration Update procedure then the following inputs are optional (if available): Mapping Of Requested NSSAI, Allowed NSSAI for current Access Type, Allowed NSSAI for the other Access Type, and the corresponding Mapping Of Allowed NSSAIs.

If this service operation is invoked during PDU Session Establishment procedure then the following input is optional: HPLMN S-NSSAI that maps to the S-NSSAI from the Allowed NSSAI of the Serving PLMN.

Outputs, Conditional Required:

If this service operation is invoked during Registration procedure not triggered by mobility from EPS to 5GS or UE Configuration Update procedure, then one or more of the following outputs are required: Allowed NSSAI, Configured NSSAI; Target AMF Set or, based on configuration, the list of candidate AMF(s).

If this service operation is invoked during Registration procedure triggered by mobility from EPS to 5GS with N26 (as described in clause 4.11.1.3.3), the following output is required: S-NSSAIs for the HPLMN associated with established PDN connection, Mapping of S-NSSAIs associated with established PDN connection in the Serving PLMN.

If this service operation is invoked during PDN Connection Establishment in the Serving PLMN in EPS by a PGW-C+SMF, the following outputs are required: Subscribed S-NSSAIs for the UE, Mapping of S-NSSAIs associated with the subscribed S-NSSAIs for the UE in the Serving PLMN.

Else, if this service operation is invoked during PDU Session Establishment procedure then the following outputs are required: The NRF to be used to select NFs/services within the selected Network Slice instance.

Outputs, conditional Optional:

If this service operation is invoked during UE Registration procedure or UE Configuration Update procedure, then one or more of the following outputs are optional: Mapping Of Allowed NSSAI, Mapping Of Configured NSSAI, NSI ID(s) associated with the Network Slice instances of the Allowed NSSAI, NRF(s) to be used to select NFs/services within the selected Network Slice instance(s) and NRF to be used to determine the list of candidate AMF(s) from the AMF Set, rejected S-NSSAI with cause of rejection.

Else, if this service operation is invoked during PDU Session Establishment procedure, then the following output is optional: NSI ID associated with the S-NSSAI provided in the input.

APPENDIX B FROM THE PROVISIONAL PATENT APPLICATION

The provisional patent application to which this application claims priority included an Appendix B, which is reproduced in relevant part below:

Change Request

Reason For Change: For a UE being served by EPS and with established PDN Connections we have three different scenarios for a PDN Connection: (1) The UE is served in its home network; (2) The UE is served in a visited network with home routed traffic; (3) The UE is served in a visited network with LBO.

In all three cases, with surviving PDN connections when moving to 5GS, combined PGW-C+SMFs are used and during PDN Connection establishment the UE allocates respective PDU Session ID and sends it to the PGW-C+SMF via PCO. An S-NSSAI associated with each PDN connection is determined based on the operator policy by the PGW-C+SMF, e.g. based on a combination of PGW-C+SMF address and APN, and sent to the UE in PCO together with a PLMN ID that the S-NSSAI relates to (refer to 23.501 clause 5.15.7.1).

When UE moves from EPS to 5GS, the UE includes the S-NSSAIs (with values for the Serving PLMN of the target 5GS, if available) associated with the established PDN connections in the Requested NSSAI in RRC Connection Establishment and NAS. The UE also provides to the AMF in the Registration Request message the mapping information as described in clause 5.15.6 (refer to 23.501 cl 5.15.7.2).

For case 1 and 2 the UE will get hS-NSSAI(s) (S-NSSAIs valid in the home network) in the PCO from the combined PGW-C+SMFs.

For case 3 the UE will get vS-NSSAI(s) (S-NSSAIs valid in the visited network) in the PCO from the combined PGW-C+SMFs.

Without checking that an allocated hS-NSSAI or vS-NSSAI (through its mapped hS-NSSAI) is allowed, according to the UEs subscribed S-NSSAIs, there is a risk at mobility from EPS to 5GS that AMF needs to release PDU Session(s) associated to S-NSSAI(s) not allowed according to the UEs subscribed S-NSSAIs. This is valid in case the PGW-C+SMF supports more than one S-NSSAI and at least one of these are also allowed according to the UEs subscribed S-NSSAIs The question is then how such a combined PGW-C+SMF should ensure that an allocated hS-NSSAI or vSNSSAI is allowed according to the UEs subscribed S-NSSAIs?

For case 1 and 2 the combined PGW-C+SMF allocates an hS-NSSAI and would then be required to check that the selected hS-NSSAI is among the UEs subscribed S-NSSAI. This could be achieved by letting the SMF use the Nudm_SDM_Get (SUPI, Slice Selection Subscription data) service (currently only available to the AMF) to get the UEs subscribed S-NSSAI and only allocate hS-NSSAI among them. For case 1 and 2 the procedure in the combined PGW-C+SMF should look like: (1) Fetch subscribed S-NS- SAIs (hS-NSSAIs) from UDM; (2) Select a h-NSSAI from the hS-NSSAIs acquired in step I and include it in the PCO to the UE at PDN connection establishment.

For case 3 the combined PGW-C+SMF allocates an vS-NSSAI and would then be required to check that the selected vS-NSSAI is mapped to an hS-NSSAI that is among the UEs subscribed S-NSSAI. To get the subscribed S-NSSAIs the same procedure as proposed for case 1 and 2 above can be used. But to get the mapping between subscribed S-NSSAIs and corresponding vS-NSSAIs an adjustment of the Nnssf_NSSelection_Get service from the NSSF is needed. The service should be available from the PGW-C+SMF and as input/output it should be possible to provide subscribed S-NSSAI. For case 3 the procedure in the combined PGW-C+SMF should look like: (1) Fetch subscribed S-NSSAIs (hS-NSSAIs) from UDM; (2) Get corresponding vS-NSSAI for each subscribed S-NSSAI by querying the NSSF; and (3) Select a vS-NSSAI from the vS-NSSAIs acquired in step II and include it in the PCO to the UE at PDN connection establishment.

Summary Of Change: Let the PGW-C+SMF at PDN Connection establishment only allocate hS-NSSAI or vS-NSSAI (via mapped hS-NSSAI) that is allowed, according to the UEs subscribed S-NSSAIs.

Consequences if not approved: There is a risk at mobility from EPS to 5GS that AMF needs to release PDU Session(s) associated to S-NSSAI(s) not allowed according to the UEs subscribed S-NSSAIs.

5.15.7 Network slicing and Interworking with EPS 5.15.7.1 General

A 5GS supports Network Slicing and might need to interwork with the EPS in its PLMN or in other PLMNs as specified in clause 5.17.2. The EPC may support the Dedicated Core Networks (DCN). In some deployments, the MME selection may be assisted by a DCN-ID provided by the UE to the RAN (see TS 23.401 [26]).

Mobility between 5GC to EPC does not guarantee all active PDU Session(s) can be transferred to the EPC.

During PDN connection establishment in the EPC, the UE allocates the PDU Session ID and sends it to the PGW-C+SMF via PCO. An S-NSSAI associated with the PDN connection is determined based on the operator policy by the PGW-C+SMF, e.g. based on a combination of PGW-C+SMF address and APN, and is sent to the UE in PCO together with a PLMN ID that the S-NSSAI relates to. The PGW-C+SMF should only select an S-NSSAI that is mapped to an S-NSSAI among the subscribed S-NSSAIs of the UE. The UE stores this S-NSSAI and the PLMN ID associated with the PDN connection. The UE derives Requested NSSAI by taking into account of the received PLMN ID. The Requested NSSAI is included in NAS Registration Request message and RRC carrying this Registration Request when the UE registers in 5GC if the UE is non-roaming or the UE has Configured NSSAI for the VPLMN in roaming case.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method comprising:
a session management entity storing two or more supported network slice identifiers;
the session management entity transmitting to a data management function a request for a set of subscribed network slice identifiers identifying one or more network slices to which a user equipment (UE) is subscribed;
the session management entity receiving, from the data management function, a set of subscribed network slice identifiers to which the UE is subscribed;
the session management entity selecting a supported network slice identifier from among the stored two or more supported network slice identifiers; and
transmitting, to the UE, a message indicating the selected supported network slice identifier, wherein
the step of selecting the supported network slice identifier from the set of two or more supported network slice identifiers comprises:
checking that the selected supported network slice identifier is among the set of subscribed network slice identifiers, or checking that the selected supported network slice identifier is among a set of mapped network slice identifiers.

2. The method of claim 1, wherein the UE is served by the session management entity in a second network.

3. The method of claim 2, wherein
the method further comprises the step of receiving, from the UE, a session identifier identifying a connection between the UE and a data network, and
the message transmitted to the UE indicates that the selected network slice identifier is associated with the connection between the UE and the data network, the selected network slice identifier identifying a network slice that can support the connection between the UE and the data network when the UE is handed over from the second network to a first network.

4. The method of claim 3, wherein the session management entity is configured to operate as a Session Management Function (SMF) in the first network and as a Packet Data Network Gateway-Control (PGW-C) in the second network.

5. The method of claim 1, wherein
the received set of subscribed network slice identifiers comprises a first subscribed network slice identifier, and
the step of selecting the supported network slice identifier comprises determining whether the supported network slice identifier matches the first subscribed network slice identifier.

6. The method of claim 1, wherein
the received set of subscribed network slice identifiers comprises a first subscribed network slice identifier,
the step of selecting the subscribed network slice identifier comprises: i) transmitting to a network slice selection function (NSSF) a query comprising the first subscribed network slice identifier; ii) receiving from the NSSF a response to the query wherein the response to the query comprises a mapped network slice identifier to which the first subscribed network slice identifier is mapped; and iii) determining whether the supported network slice identifier matches the mapped network slice identifier.

7. The method of claim 6, wherein the mapped network slice identifier is a visited network Single Network Slice Selection Assistance Information (S-NSSAI).

8. The method of claim 1, wherein the received set of subscribed network slice identifiers comprises a home network Single Network Slice Selection Assistance Information (S-NSSAI).

9. The method of claim 1, wherein
the data management function is a Unified Data Management Function (UDM),
the subscribed set of network slice identifiers comprises at least one Single Network Slice Selection Assistance Information (S-NSSAI), and
the two or more supported network slice identifiers comprises at least one S-NSSAI.

10. A computer program product comprising a non-transitory computer readable medium storing a computer program comprising instructions which when executed by processing circuitry causes the processing circuitry to perform the method of claim 1.

11. A session management entity comprising:
processing circuitry; and
a memory, the processing circuitry being configured to access data stored in the memory;
wherein the session management entity is configured to:
transmit, to a data management function, a request for a set of subscribed network slice identifiers identifying one or more network slices to which a user equipment (UE) is subscribed;
receive, from the data management function, a set of subscribed network slice identifiers to which the UE is subscribed;
select a supported network slice identifier from among two or more stored network slice identifiers supported by the session management entity; and
transmit, to the UE, a message indicating the selected supported network slice identifier, wherein
the session management entity is configured to select the supported network slice identifier by performing a process that includes:
checking that the selected supported network slice identifier is among the set of subscribed network slice identifiers, or
checking that the selected supported network slice identifier is among a set of mapped network slice identifiers.

12. The session management entity of claim 11, wherein the session management entity is further configured to serve the UE in a second network.

13. The session management entity of claim 12, wherein the session management entity is configured to receive, from the UE, a session identifier identifying a connection between the UE and a data network, and
the message transmitted to the UE indicates that the selected network slice identifier is associated with the connection between the UE and the data network, the selected network slice identifier identifying a network slice that can support the connection between the UE and the data network when the UE is handed over from the second network to a first network.

14. The session management entity of clam 12, wherein the network entity is configured to operate as a Packet Data Network Gateway-Control (PGW-C) in the second network.

15. The session management entity of claim 11, wherein
the received set of subscribed network slice identifiers comprises a first subscribed network slice identifier, and
the session management entity is configured to select the supported network slice identifier by performing a process that includes determining whether the supported network slice identifier matches the first subscribed network slice identifier.

16. The session management entity of claim 11, wherein
the received set of subscribed network slice identifiers comprises a first subscribed network slice identifier, and
the session management entity is configured to select the supported network slice identifier by performing a process that comprises:
transmitting to a network slice selection function (NSSF) a query comprising the first network slice identifier;
receiving from the NSSF a response to the query wherein the response to the query comprises a mapped network slice identifier to which the first subscribed network slice identifier is mapped; and
determining whether the supported network slice identifier matches the mapped network slice identifier.

17. The session management entity of claim 16, wherein the mapped network slice identifier is a visited network Single Network Slice Selection Assistance Information, S-NSSAI.

18. The session management entity of claim 15, wherein the first network slice identifier is a home network Single Network Slice Selection Assistance Information, S-NSSAI.

19. The session management entity of claim 11, wherein
the data management function is a Unified Data Management Function (UDM),
the subscribed set of network slice identifiers comprises at least one Single Network Slice Selection Assistance Information (S-NSSAI), and
the second set of network slice identifiers comprises at least one Single Network Slice Selection Assistance Information, S-NSSAI.

20. The session management entity of claim 11, wherein
the session management entity is further configured to determine whether or not the session management entity supports more than one network slice identifier, and
the session management entity is further configured to transmit the request to the data management function in response to determining that the session management entity supports more than one network slice identifier.

* * * * *

UNITED STATES PATENT AND TRADEMARK OFFICE
CERTIFICATE OF CORRECTION

PATENT NO.       : 11,259,240 B2
APPLICATION NO.  : 16/536765
DATED            : February 22, 2022
INVENTOR(S)      : Hedman et al.

It is certified that error appears in the above-identified patent and that said Letters Patent is hereby corrected as shown below:

In the Claims

Column 18, Line 14, Claim 1, delete "a set of subscribed" and insert -- the set of subscribed --, therefor.

Column 18, Lines 26-28, Claim 1, delete "checking that the selected supported network slice identifier is among a set of mapped network slice identifiers." and insert the same at Line 27, as a sub-point.

Column 19, Line 10, Claim 9, delete "Function (UDM)," and insert -- (UDM), Function --, therefor.

Column 20, Line 4, Claim 14, delete "clam" and insert -- claim --, therefor.

Column 20, Line 40, Claim 19, delete "Function (UDM)," and insert -- (UDM), Function --, therefor.

Signed and Sealed this
Sixteenth Day of August, 2022

Katherine Kelly Vidal
*Director of the United States Patent and Trademark Office*